Oct. 6, 1953     A. J. LEWIS     2,654,260
POWER TRANSMISSION MECHANISM
Filed Aug. 2, 1950     2 Sheets-Sheet 1
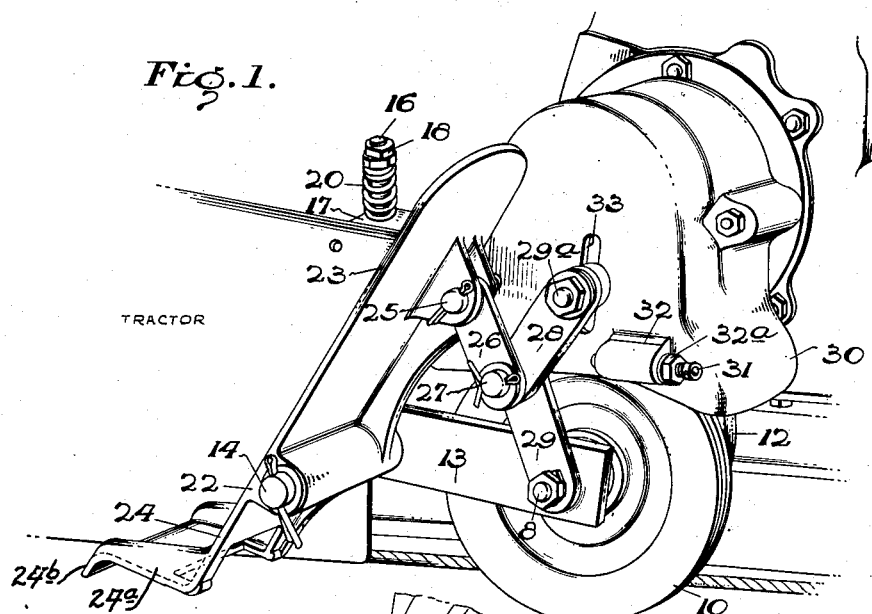
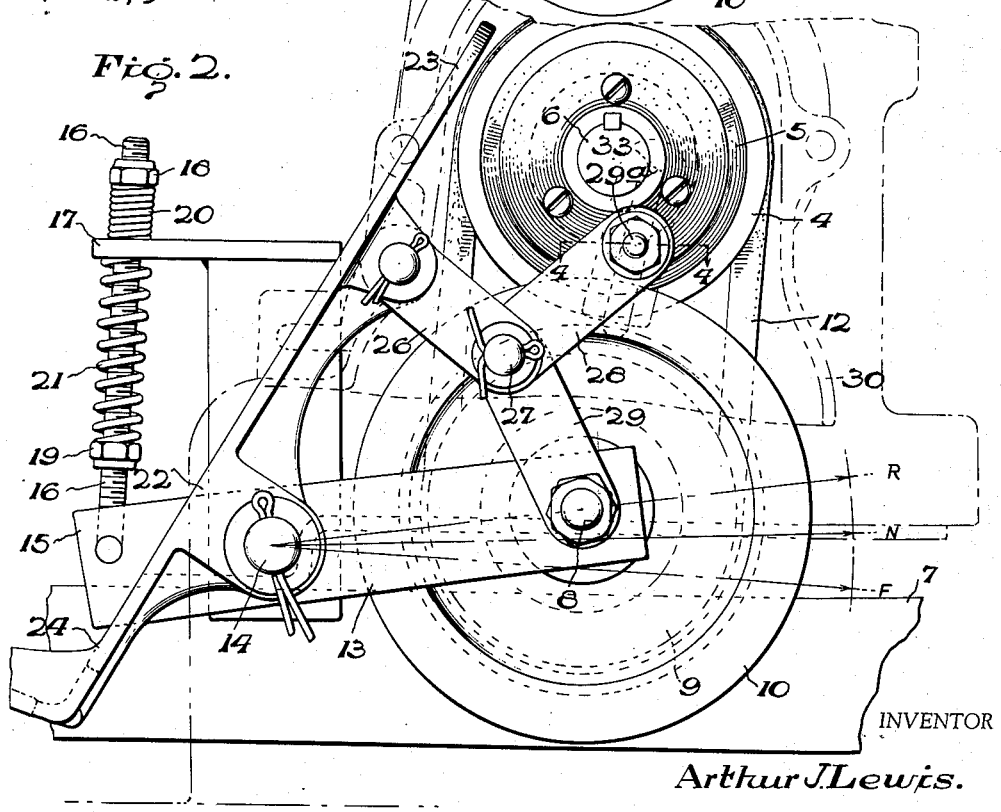
INVENTOR
*Arthur J. Lewis.*
BY *Scrivener & Parker*
ATTORNEYS

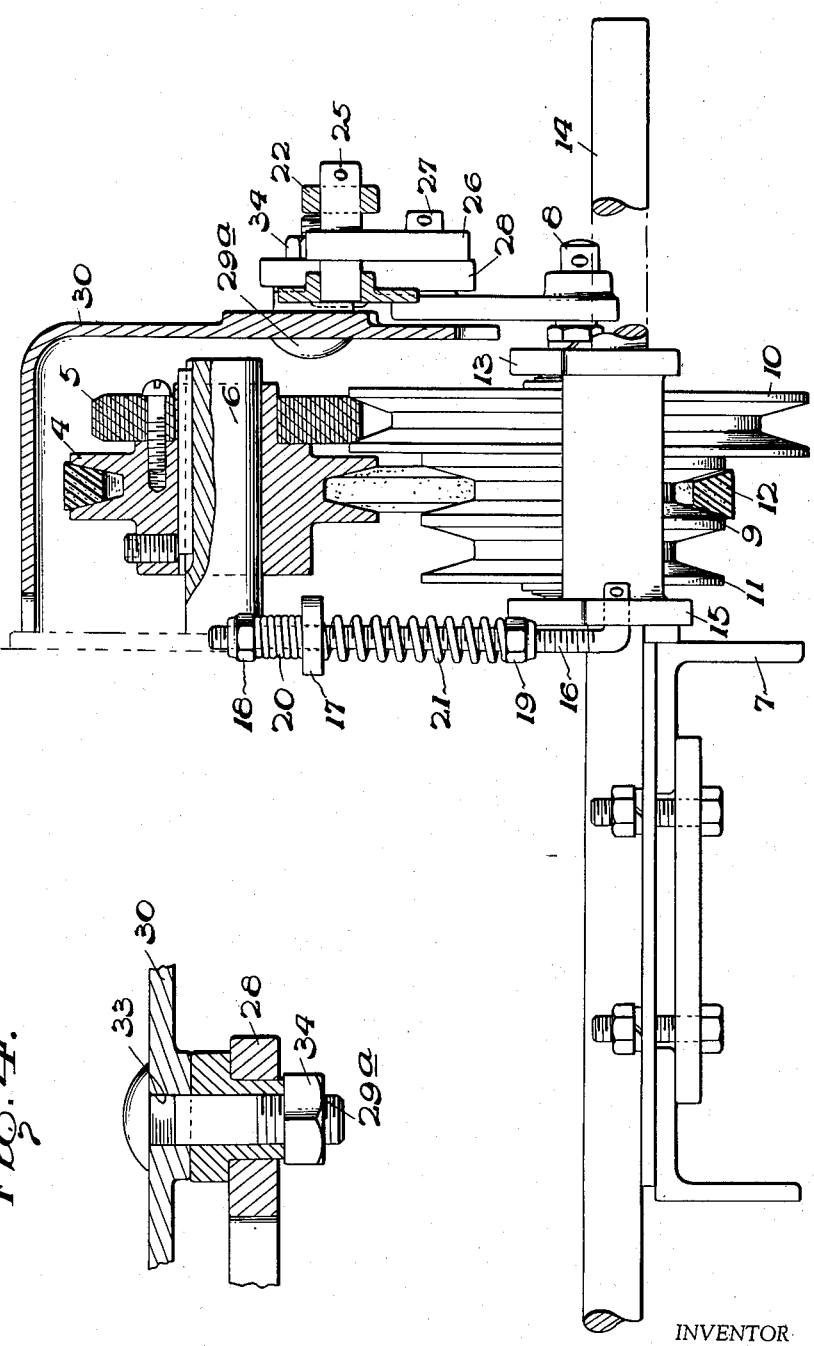

Patented Oct. 6, 1953

2,654,260

UNITED STATES PATENT OFFICE 2,654,260

POWER TRANSMISSION MECHANISM

Arthur J. Lewis, Stratford, Conn., assignor to The Baird Machine Company, Stratford, Conn., a corporation of Connecticut Application August 2, 1950, Serial No. 177,215

10 Claims. (Cl. 74—203)

1

This invention relates to power transmission mechanism, and more particularly to control mechanism for a forward and reverse tractor transmission mechanism of the friction tyype.

Mechanisms of this general type have been previously proposed, but due to wear which is inherent in a transmission of the friction type and which affects the adjustment of the control mechanism, difficulty has been experienced in maintaining proper adjustment in mechanisms of this type, and it is accordingly an object of the present invention to provide novel adjusting mechanism for such transmission control mechanism.

Another object is to provide control means so constituted as to permit locking the transmission in driving position.

Yet another object is to provide means for normally maintaining the control mechanism in a neutral position.

A still further object is to provide adjusting means adapted to compensate for wear in the transmission mechanism as well as means for positioning the control means in accordance with the individual preference of the operator.

Another object of the invention is to provide, in mechanism of the above type, control means so constituted as to permit the operator to readily effect a controlled slipping of the friction drive mechanism.

Still another object is to provide, in mechanism of the above type, an operator-controlled member for the mechanism so constituted as to be adapted for easy and efficient operation by the operator regardless of whether forward or reverse drive is being selected.

These and other objects and features of the invention will be more readily apparent to those skilled in the art when considered in the light of the accompanying description, but it is to be expressly understood that the description is not to be taken as limiting the invention, reference being had for this purpose to the appended claims.

In the drawings, wherein similar reference characters are utilized in the several views:

Fig. 1 is a perspective view of a control mechanism for a forward and reverse transmission;

Fig. 2 is a side view of the control mechanism;

Fig. 3 is an end view of the mechanism of Fig. 1 taken from the left, and

Fig. 4 is a partial sectional view taken along line 4—4 of Fig. 2.

Referring first to Fig. 3, the transmission mechanism includes a belt pulley 4 and a friction wheel 5 mounted on a driven or motor shaft 6 for rotation therewith, the shaft being mounted on a frame 7. A driven pulley shaft 8, shown more clearly in Fig. 2, is provided with a driven pulley 9, a friction wheel 10 and an output pulley 11, these being connected together and mounted for rotation on shaft 8. As shown in this view, friction wheels 5 and 10 are in engagement for reverse rotation, and a drive belt 12, of the V type, extends loosely around pulleys 4 and 9 and is held out of engagement in a well known manner by means of a suitable support, not shown, this being a well known expedient in transmissions of this type. From the foregoing, it will be apparent that with the shafts spaced as shown they will be connected for reverse rotation, while spacing the shafts a suitable further distance apart will disengage the friction pulleys to provide a neutral position, a still further increase in the spacing serving to engage pulleys 4 and 9 with belt 12 to provide a forward drive connection of the shafts. The output pulley 11 is provided for connection through a suitable belt, not shown, to a mechanism, such as the wheels of a tractor, for example, which is to be driven from the transmission.

In order to permit variation of the spacing of the shafts to effect the above described reverse and forward driving connections therebetween the lower shaft 8 is mounted on a swinging arm 13 rotatably supported on a shaft 14 carried by frame 7, the arm being provided with a rearward extension 15. In order to provide a neutral position of shaft 8 relative to shaft 6, means are provided for resiliently biasing the arm to a corresponding neutral position, such means including a rod 16 having a pivotal connection with the arm as shown and adapted to slide in a bore, not shown, in a bracket 17 mounted on frame 7. The rod is threaded as shown and provided with adjusting nuts 18 and 19 positioned respectively above and below the bracket, biasing springs 20 and 21 being positioned between the bracket and adjusting nuts 18 and 19 respectively. Since the parts are shown in reverse position in Fig. 3, as well as in Fig. 2, the upper spring 20 is compressed and the lower spring 21 is extended, the spring 20 tending, through rod 16, to rotate arm 13 in a clockwise direction until the spring forces are balanced, the spacing of the shafts under this condition corresponding to neutral position.

The control mechanism is best shown in Figs. 1 and 2, a control lever 22, which in the present instance is shown as a control pedal pivotally mounted on shaft 14 and provided with toe and heel portions 23 and 24 and a rearwardly extending pedal portion 24a having a downwardly extending end portion 24a arranged and proportioned to accommodate the operator's foot to permit the operator to most readily and efficiently rock the lever in either direction, being connected by pin 25, link 26 and pin 27 to a pair of toggle links 28 and 29 forming an over-center toggle, which links are also pivotally mounted at one end on pin 27. In order to effect a control of the spacing of the driving and driven shafts, link 28 is pivotally mounted at its upper end on a pin 29a supported, in a manner to be more fully described hereinafter, on a housing 30 attached to frame 7, while link 29 is connected to the right end of the swinging arm 13 by virtue of its pivotal mounting on the outer end of shaft 8 carried by the arm. The parts are shown in neutral position in Fig. 1, and the arrangement of the links is such that on clockwise rotation of lever 22 from the position shown in Fig. 1 the toggle comprising links 28 and 29 and pin 27 will swing to the right toward an over-center position and move arm 13, shaft 8 and pulley 9 downward to establish driving engagement of pulleys 4 and 9 with belt 12 to connect the shafts for rotation in the same direction, while on movement of the lever in a counterclockwise direction, the toggle is moved to the left to lessen the distance between the shafts and establish engagement between friction pulleys 5 and 10 to connect the shafts for rotation in opposite directions.

In transmissions of this type, it is often desirable to control the mechanism in such a manner as to effect a partial driving connection between the shafts, giving the effect of a slipping clutch, and to this end the control links are so arranged as to permit this type of control by the operator. In the event pivot pins 25 and 27 were to rest normally along a line at right angles to the center line of pins 8 and 29a, the force exerted by the toggle to separate the shafts as the toggle approached the over-center position would be very rapid, and the toggle could be operated by the exertion of a relatively small force on the control lever by the operator, but under this condition it would be difficult for the operator to operate the control lever with sufficient accuracy to maintain a slipping condition between the shafts. In the present instance, therefore, the toggle, in neutral position, is preferably operated by placing the link 26 approximately in line with lower toggle link 29, with the result that under this condition the centers of pins 25 and 27 and shaft 8 are also approximately in line. With this arrangement, the control lever has a substantially direct connection with shaft 8 through links 26 and 29, and the amount of movement of shaft 8 in effecting forward or reverse drive is of substantially the same order as the movement of control lever pivot pin 25. This requires the exertion of greater force by the operator, but since the forces are relatively low in any case, a better feel is obtained relative to the slipping condition, the force which must be exerted on link 26 by the operation of pedal 22 is approximately the same regardless of whether forward or reverse drive is being established, a more precise control is obtained by the operator, while the advantage of an over-center toggle adapted to lock in forward drive is retained.

The arrangement of the foot pedal 22 and the relative positioning of the various portions thereof also contributes materially to the easy and efficient operation of the control pedal by the operator to establish a full or partial forward or reverse drive connection desired, the arrangement of the various portions of the pedal being such as to provide proper leverage for easy operation of the mechanism regardless of the type of drive connection being selected. Referring again more particularly to Fig. 1, it will be noted that the pedal 22 includes portion 23 adapted to receive the sole or forward portion of the operator's foot, the portion 24 adapted to engage the operator's heel, the rearwardly extending portion 24a adapted to prevent the operator's foot from slipping downwardly off the pedal, and the downwardly extending portion 24b which is adapted to engage the shoe of the operator just forward of the heel when it is desired to rotate the pedal in a counterclockwise direction to operate the mechanism to establish reverse drive.

Although the use of so called heel and toe pedals has previously been resorted to in connection with mechanisms wherein it was desirable to provide a control pedal operable in either direction from a neutral position, such pedals have been so constituted as to provide insufficient leverage to insure satisfactory control in both clockwise and counterclockwise operation of the pedal. In the arrangement shown in Fig. 1, these difficulties are avoided, as will be more fully explained hereinafter. With the transmission mechanism in neutral position, the operator's foot rests naturally on the pedal with the back portion of the heel resting against the portion 24a in such a manner as to prevent the foot from slipping downward off the pedal. If the operator desires to rotate the pedal in a clockwise direction to establish the forward drive, he merely pushes down on the pedal with the ball of the foot, and sufficient leverage is provided to give satisfactory operation and control under this condition, the toggle being readily moved to over-center position through the link 26. If it is desired to return the pedal and mechanism to neutral position, it is probable that the pressure of the operator's heel alone on pedal portion 24 will be sufficient, but in the event the operator desires to establish reverse drive, it is probable that increased leverage will be required, in which case it is only necessary that the operator slide his foot downward on the pedal until the portion of his shoe between the sole and heel engages the downwardly extending portion 24b of pedal 22, whereupon the pedal can be rotated in a counterclockwise direction to establish reverse drive with the operator's foot in secure and non-slipping engagement with the pedal and with a leverage which is substantially equivalent to that available to the operator when the pedal is moved to establish forward drive. Thus it is apparent that the present invention provides, in a pedal of the heel and toe type, an arrangement wherein the operator, by a slight and natural shift of the foot on the pedal when selecting forward or reverse drive, can obtain substantially the same mechanical advantage for operation of the pedal in either direction, while at the same time retaining the simplicity of a single pedal control for establishing forward, neutral, or reverse positions of the transmission drive mechanism.

The present invention thus combines the above advantage with that inherent in the over-center toggle construction which permits locking of the toggle in over-center position for forward drive, it being apparent that the over-center toggle portion of the mechanism in this instance is utilized primarily for locking purposes, rather than for the usual purpose of obtaining increased mechanical advantage. Such locking is effected in the embodiment shown by means of a stop such as an adjustable screw 31 carried by a boss 32 formed on housing 30 and having a locknut 32a, the screw being adapted to engage the lower end of link 28 with the toggle in an over-center position, it being apparent that dependent on the degree of resiliency of the belt 24 the over-center position can be adjusted to give a positive drive with the parts in this position.

A further adjustment is provided to compensate for wear of the friction driving parts, the pin 29a being slidably mounted at its inner end, as indicated in more detail in Fig. 4, in a slot 33 formed in housing 30, and clamped to the housing as by means of a nut 34. Thus the position of pin 29a may be readily adjusted to provide for the proper spacing of the shafts with the toggle in the over-center position to insure a positive forward drive regardless of wear, while in reverse drive compensation for wear can be effected by increasing the counterclockwise movement of the control lever. In addition, the adjusting screw or toggle stop 31, if used, and the position of pivot pin 29a may within certain limits be simultaneously adjusted to position the control pedal in accordance with the convenience of the operator.

While the invention has been illustrated and described herewith with considerable particularity, it is to be expressly understood that the same is not limited to the form shown but may receive a variety of expressions as will appear more readily to those skilled in the art. Reference will, therefore, be had to the appended claims for a definition of the limits of the invention.

What is claimed is:

1. Forward and reverse transmission mechanism including spaced driving and driven pulleys, a fixed support for the driving pulley and a support for the driven pulley movable to increase or decrease the spacing of the axes of said pulleys, frictional connecting means associated with said pulleys and selectively operable in response to variation in the spacing of said pulleys to connect the latter for rotation in the same or reverse directions, a pair of pivotally connected toggle links connected to and providing a connection between said supports and movable in one direction to an over-center position to space said pulleys for connection for rotation in the same direction and movable away from said over-center position to another position to space said pulleys for connection for rotation in opposite directions, a control lever, and a connecting link pivotally connected between the control lever and the pivotal connection of said toggle links for operating said toggle links.

2. Forward and reverse transmission mechanism including spaced driving and driven pulleys, a fixed support for the driving pulley and a support for the driven pulley movable to increase or decrease the spacing of said pulleys, frictional pulley connecting means associated with said pulleys and selectively operable in response to variation in the spacing of said pulleys to connect the latter for rotation in the same or reverse directions, a pair of pivotally connected toggle links connected to and providing a connectio between said supports and movable in one direction to an over-center position to space said pulleys for connection for rotation in the same direction and movable away from said over-center position to another position to space said pulleys for connection for rotation in opposite directions, a stop mounted on one of said supports and adapted to engage one of said toggle links for limiting movement of said toggle links beyond said over-center position, and means for actuating said toggle links including a control lever and a connection between said lever and said toggle links.

3. Forward and reverse transmission mechanism including spaced driving and driven pulleys, a fixed support for the driving pulley and a support for the driven pulleys movable to increase or decrease the spacing of the axes of said pulleys, frictional pulley connecting means associated with said pulleys and selectively operable in response to variation in the spacing of said pulleys to connect the latter for rotation in the same or reverse directions, a pair of pivotally connected toggle links connected to and providing a connection between said supports and movable in one direction to an over-center position to space said pulleys for connection for rotation in the same direction and movable away from said over-center position to another position to space said pulleys for connection for rotation in opposite directions, an adjustable stop mounted on one of said supports and adapted to engage one of said toggle links for fixing the over-center position of the toggle links, and means for actuating the toggle links including a control lever and a connection between the lever and said toggle links.

4. Forward and reverse transmission mechanism including spaced driving and driven pulleys, a fixed support for the driving pulley and a support for the driven pulley movable to increase or decrease the spacing of the axes of said pulleys, frictional pulley connecting means associated with said pulleys and selectively operable in response to variation in the spacing of said pulleys to connect the latter for rotation in the same or reverse directions, a pair of pivotally connected toggle links connected to and providing a connection between said supports and movable in one direction to an over-center position to space said pulleys for connection for rotation in the same direction and movable away from said over-center position to another position to space said pulleys for connection for rotation in opposite directions, a stop mounted on one of said supports and adapted to engage one of said toggle links in over-center position to fix said position, means for actuating said toggle links including a control lever and a connection between said lever and toggle links, and means for varying the spacing of said shafts when said toggle links are in said over-center position including a toggle link connecting element carried by one of said members for connecting one of the toggle links therewith, said element being movable to selected positions on said one member, and means for maintaining said element in a selected position on said one member.

5. In a transmission mechanism of the type having a pair of spaced driving and driven pulleys and operable at one spacing of the pulleys to establish a driving connection between the pulleys for relative rotation in one direction and operable at another spacing thereof to establish a driving connection therebetween for relative rotation in another direction, means for controlling the spacing of said pulleys including a pair of connected toggle links forming a connection between said pulleys movable to an over-center position to space the pulleys for connection for rotation in the said one direction and movable away from said over-center position to another position to space the pulleys for connection for rotation in said another direction, a control lever having a connection with said toggle links, and means for adjusting the positioning of said control lever relative to the positioning of said pulleys by said toggle links including an adjustable stop cooperating with said pulley spacing controlling means for establishing said over-center position of said links and separate adjusting means associated with one of said toggle links for varying the spacing between said pulleys at any selected position of said control lever.

6. Forward and reverse transmission mechanism including spaced driving and driven pulleys, a fixed support for the driving pulley and a support for the driven pulley movable to increase or decrease the spacing of the axes of said pulleys, frictional drive means associated with said pulleys and selectively operable in response to variation in the spacing of said pulleys to effect forward or reverse drive connections therebetween, a pair of pivotally connected toggle links connected to and providing a connection between said supports and movable in one direction to an over-center position to space said pulleys for connection of said drive means for rotation in the same direction and movable away from said over-center position to another position to space said pulleys for connection of said drive means for rotation in opposite directions, a control lever, a connecting link between the control lever and said toggle links for operating said toggle links, and means for normally maintaining said toggle links in a position intermediate said over-center position and said another position including a pair of resilient members connected with said movable member and positioned to oppose movement of said member in either direction from said intermediate position.

7. Control mechanism for controlling the spacing of a pair of relatively movable members including a control lever, a substantially straight line operating connection between said lever and one of said members for moving said one member a distance substantially proportional to the degree of movement of said control lever, said substantially straight line operating connection including a pair of links having a pivotal connection at one end thereof and having pivotal connections at their other ends with said control lever and said one member respectively, and means including a third link cooperating with said pair of links for guiding the movement thereof and operable in response to a predetermined degree of movement of said lever in one direction to lock said members in spaced relationship, said last named link having a fixed pivotal connection at one end and a pivotal connection at the other end with one of the first named links and being positioned with respect to the link connected to said one member to form, in connection therewith, an over-center toggle for locking said members in said spaced relationship.

8. Control mechanism for controlling the spacing of a pair of relatively movable members including a control lever, a substantially straight line operating connection between said lever and one of said members for moving said one member a distance substantially proportional to the degree of movement of said control lever, said substantially straight line operating connection including a pair of links having a pivotal connection at one end thereof and having pivotal connections at their other ends with said control lever and said one member respectively, means including a third link cooperating with said pair of links for guiding the movement thereof and connecting said members and operable in response to a predetermined degree of movement of said lever in one direction to lock said members in spaced relationship, said last named link having a fixed pivotal connection and another pivotal connection with one of the first named links and being positioned with respect to the link connected to said one member to form, in connection therewith, an over-center toggle for locking said members in said spaced relationship, and a stop associated with said mechanism for positioning said toggle in an over-center locking position.

9. In a transmission mechanism adapted for forward and neutral drive relationship comprising a pair of rotatable spaced members, relatively movable supports for said members and friction drive means associated with said members selectively operable in accordance with variation in the spacing thereof for effecting a forward or a neutral drive relationship therebetween, means for controlling the spacing of said members including a control lever, a substantially straight line operative connection between said lever and one of said supports for effecting movement of said one support substantially in proportion to the degree of movement of said lever, said connection including a pair of pivotally connected links having pivotal connections respectively with said one support and said lever, means including a third link cooperating with said pair of links for guiding the movement thereof, said third link having a fixed pivotal connection and a pivotal connection with one of the first named links and forming, in connection with one of said links, an overcenter toggle operable in a selected position for locking said supports in one of said spaced apart driving relationships, and a stop associated with said control mechanism for positioning said over-center toggle in said selected position.

10. In a transmission mechanism of the type having forward, neutral and reverse drives and including spaced shafts, friction means associated therewith selectively operable in response to variation in the spacing of the shafts to establish forward, neutral, or reverse drive connections, and means for controlling the spacing of said shafts to establish said drive connections, the improvement which comprises a control lever, a substantially straight line operative connection between said lever and one of said shafts including a pair of links having pivotal connections respectively with the lever and with said one shaft and being pivotally connected together intermediate the lever and shaft connections substantially in line therewith, means cooperating with said pair of links for guiding the latter for movement by said lever for varying the spacing of said shafts to establish said drive connections including a third link having a fixed pivot and a pivotal connection with the link connected with said one shaft, the latter link forming, in connection with said third link, an over-center toggle for locking the control mechanism in a position to establish one of said drive connections, and a stop associated with said control means for preventing movement of the control mechanism in one direction beyond said position.

ARTHUR J. LEWIS.

References Cited in the file of this patent
UNITED STATES PATENTS

| Number | Name | Date |
| --- | --- | --- |
| 812,823 | Clay | Feb. 20, 1906 |
| 870,135 | Schneider | Nov. 5, 1907 |
| 1,140,428 | Winter | May 23, 1915 |
| 2,068,962 | Sanford | Jan. 26, 1937 |